United States Patent [19]

Gourd

[11] Patent Number: 5,061,137
[45] Date of Patent: Oct. 29, 1991

[54] FASTENER WITH RESILIENT LINKING MEANS

[75] Inventor: James T. Gourd, Dearborn, Mich.

[73] Assignee: Ford Motor Company, Dearborn, Mich.

[21] Appl. No.: 692,754

[22] Filed: Apr. 29, 1991

[51] Int. Cl.$^5$ .............................................. F16B 19/00
[52] U.S. Cl. .................................... 411/510; 411/392; 411/907; 411/908; 411/916
[58] Field of Search ........ 411/340, 342, 392, 508-510, 411/907, 908, 913, 916

[56] References Cited

U.S. PATENT DOCUMENTS

| | | | |
|---|---|---|---|
| 204,913 | 6/1878 | Pratt | 411/510 |
| 2,567,372 | 9/1951 | Gelpcke | 411/342 |
| 2,791,366 | 5/1957 | Geisler | 411/907 |
| 3,102,447 | 9/1963 | Gregory et al. | |
| 3,296,048 | 1/1967 | Wolfe | |
| 3,367,694 | 2/1968 | Witt | |
| 3,466,966 | 9/1969 | Brown | 411/913 |
| 3,495,494 | 2/1970 | Scott | |
| 4,348,141 | 9/1980 | Dahl | |
| 4,416,572 | 11/1983 | Black | |
| 4,437,286 | 3/1984 | Maguire | |
| 4,536,112 | 8/1985 | Horsky et al. | |
| 4,589,179 | 5/1986 | Hulting, Jr. | |
| 4,591,203 | 5/1986 | Furman | 411/510 |
| 4,854,797 | 8/1989 | Gourd | |
| 4,900,208 | 2/1990 | Kaiser et al. | |
| 4,906,154 | 3/1990 | Sheppard | |
| 4,947,502 | 8/1990 | Englehardt | |

FOREIGN PATENT DOCUMENTS

| | | | |
|---|---|---|---|
| 1317354 | 1/1963 | France | 411/510 |
| 736058 | 9/1982 | France | |
| 379230 | 6/1964 | Switzerland | |
| 512315 | 6/1976 | U.S.S.R. | |
| 838124 | 6/1981 | U.S.S.R. | |
| 838125 | 6/1981 | U.S.S.R. | |
| 3197 | of 1864 | United Kingdom | |
| 309034 | 9/1930 | United Kingdom | |
| 2140890A | 4/1984 | United Kingdom | |

Primary Examiner—Neill R. Wilson
Attorney, Agent, or Firm—Damian Porcari; Clifford L. Sadler

[57] ABSTRACT

A fastener is provided which comprises a head component; a barbed shank component; and a resilient linking means connecting the head and shank components. The fastener has a longitudinal opening adapted to receive a tool for the application of force in a driving engagement with the shank component. Also provided is a method of fastening a plate member to an internally ribbed work piece using this fastener by engaging the fastener with the ribbed aperture in the work piece; inserting the tool into the longitudinal opening; and applying force to the shank component sufficient to cause axial displacement of the shank component against the resilient biasing of the linking means to maintain the head and shank components in axial tension.

7 Claims, 2 Drawing Sheets

FASTENER WITH RESILIENT LINKING MEANS

This invention relates to commonly assigned copending U.S. patent application Ser. No. 07/551,331 titled REMOVABLE FASTENER WITH ELASTIC LINKING MEANS, filed July 12, 1990.

BACKGROUND OF THE INVENTION

The present invention is directed to a multipart externally barbed fastener element which provides a resilient linking means connecting a plurality of fastened work pieces having differing coefficients of thermal expansion.

DESCRIPTION OF THE RELATED ART

Rigid fasteners have been used to attach plastic panels or plates to metal plates or frames. The plastic plate has a much larger coefficient of thermal expansion than the metal plate, thereby causing the plastic plate to elongate and contract more than the metal plate in response to temperature change. This difference in thermal expansion causes the plastic plates to expand and contract more than metal plates, thus causing the plastic to warp or buckle between the rigid fasteners. The warped or buckled plastic plates display a poor finished appearance.

In addition to the problems arising from the different coefficients of thermal expansion of the plastic plate and the metal plate are thermal expansion differences between the fastener and the work piece. If the fastener is made of metal, and at least one of the plates being fastened is made of a plastic material, the axial thickness of the plate will elongate and compress at a greater rate than the length of the fastener. This leads to two problems. When the plastic plate compresses more than the metal fastener, the plate becomes loose and is subject to vibration. When the plastic plate elongates more than the metal fastener (i.e. the thickness of the plate is larger than the length of the fastener), the plastic experiences creep in the area of the fastener head. Resilient fasteners permit elongation and compression in both the fastener and the plates without loosening.

In French patent No. 736,058 issued Sept. 12, 1932, there is disclosed an elastic bolt which permits lengthening of the bolt while maintaining a compressive force between the work piece and bolt. One embodiment of the elastic bolt has a sinusoidal shape which is elongated by a nut. The elongated bolt preloads the threads and prevents the nut from loosening.

The French patent does not teach the use of an elastic bolt in a work piece without a nut. It cannot be used where there is no access to the threaded portion of the bolt. Torque applied to the shank component is transferred through the bolt to the head. The application of torque to the shank component will tend to cause twisting of the bolt. The twisting deforms the bolt and reduces its strength. The twisting also may interfere with the removal of the bolt from a workpiece.

In my U.S. Pat. No. 4,854,797, issued Aug. 8, 1989, there is disclosed a threaded fastener with resilient linking means for use in a work piece. This fastener does not require a nut to elongate the bolt and hold a work piece in compression. A torque transmitting mechanism transfers torque applied to the head component to the shank component and causes axial displacement of the shank component in an aperture in a work piece against the resilient biasing of the resilient linking means. The torque transfer means is integrated into the bolt and designed to break as a predetermined torque is applied to the bolt head.

In my copending application Ser. No., 07/551,331, titled Removable Fastener with Elastic Linking Means there is disclosed a fastener with resilient linking means having a longitudinal opening for the application of torque to a threaded shank component. Torque transmitted to the shank component causes axial displacement of the shank component in an aperture in a work piece against the resilient biasing of the resilient linking means.

It is an object of my invention to provide a low cost, easily manufacturable, barbed fastener having a resilient linking means which when installed in a work piece maintains a compressive force between the fastener and work piece.

Another object of my invention is to provide a fastener with a resilient linking means which permits a limited amount of axial and lateral compression and elongation of the work piece and still maintain a compressive force between the fastener and work piece. This and other objects and advantages of my invention will be made apparent by the following disclosure of the invention and discussion of the preferred embodiments.

SUMMARY OF THE INVENTION

According to the present invention, a fastener is provided which comprises a head component; a barbed shank component; and a resilient linking means connecting the head and shank components. The fastener has a longitudinal opening adapted to receive a tool for the application of force in a driving engagement with the shank component.

The present invention also provides a method of fastening a plate member to an internally ribbed work piece using this fastener by engaging the fastener with the ribbed aperture in the work piece; inserting the tool into the longitudinal opening; applying force to the shank component sufficient to cause axial displacement of the shank component against the resilient biasing of the linking means to maintain the head and shank components in axial tension; and removing the tool.

A plate having an aperture slightly greater than the barbed shank component is secured to another plate or mounting bracket having internal ribs corresponding to the externally barbed shank component. The fastener is inserted through the outer plate and forced into the ribbed inner plate or plates. The application of force causes displacement of the shank component against the resilient biasing of the resilient linking means. The application of force application is then removed and the two plates are firmly attached through the axial tension of the resilient linking means.

The resilient fastener of this invention can absorb both the axial displacement due to the change in thickness of the plastic plate, and the lateral displacement normal to the fastener axis due to the change in length of the plastic plate, as the plastic plate undergoes thermal elongation and compression.

Once the fastener is installed, further axial displacement of the plates is permitted by a slight elongation of the resilient linking means. Lateral movement between the plates is also permitted by the elongation and bending of the resilient linking means. Axial contraction of the plate or wear in the vicinity of the head component is absorbed through contraction of the resilient linking means. The resilient fastener is able to maintain a tight connection over a broad range of temperatures and after partial wear of the fastener head or outer plate.

One application for the present invention is to fasten a plastic body panel to a metal frame such as a plastic pickup bed to a metal chassis. The difference between the coefficient of thermal expansion between the plastic and metal are particularly suited to the fasteners of the present invention. The fasteners securely attach the pickup bed to the chassis and permit elongation and contraction of the plastic with respect to the metal.

It is an advantage of the present invention to provide a low cost, easily manufacturable and installable, fastener containing a resilient linking means between the head and shank components. It is a further advantage of the invention to provide a fastener which permits a limited amount of axial compression and elongation of the work piece and still maintain a compressive force between the fastener and work piece. It is a further advantage of my invention to provide a fastener which permits a limited amount of lateral compression and elongation of the work piece without buckling or warping and still maintain a compressive force between the fastener and the work piece.

An additional benefit of resilient fasteners lies in a cushioning effect between the plates. Plates attached using the resilient fastener are permitted some axial and lateral movement with respect to one another. Shocks and bumps are partially absorbed by the resilient linking means.

BRIEF DESCRIPTION OF THE DRAWINGS

The earlier mentioned objects and advantages as well as others will become apparent to those skilled in the fastener arts after reading the following description with reference to the accompanying drawing in which.

DESCRIPTION OF PREFERRED EMBODIMENTS

In view of the present disclosure those skilled in the fastener arts will readily recognize the usefulness of the present invention in numerous applications in which an assembly is formed, for example, by attachment of a first component to a second component. Thus, for example, the fastener of the invention can be used to fasten together adjacent plates or to fasten a plate to a frame member, such as in the assembly of a motor vehicle body, etc. The fastener of the invention is particularly useful for attaching together two or more adjacent sheets or plates having different coefficients of thermal expansion. The axial resiliency of the fastener facilitates lateral shifting of fastened components over each other without buckling even when one or both are plastic. In such applications, it is particularly preferred that the fastener components having an interface with the fastened components comprise plastic material, rather than metal or the like, to reduce or eliminate wear of the plate at such interface. Also, the resilient linking means according to certain embodiments of the invention provides a substantial measure of lateral flexibility as well as axially elastic resiliency. This can be advantageous in allowing a fastened assembly to absorb lateral impact and/or to allow relative lateral shifting of one component relative another in the assembly due to thermal expansion/compression or the like.

Figure 1:
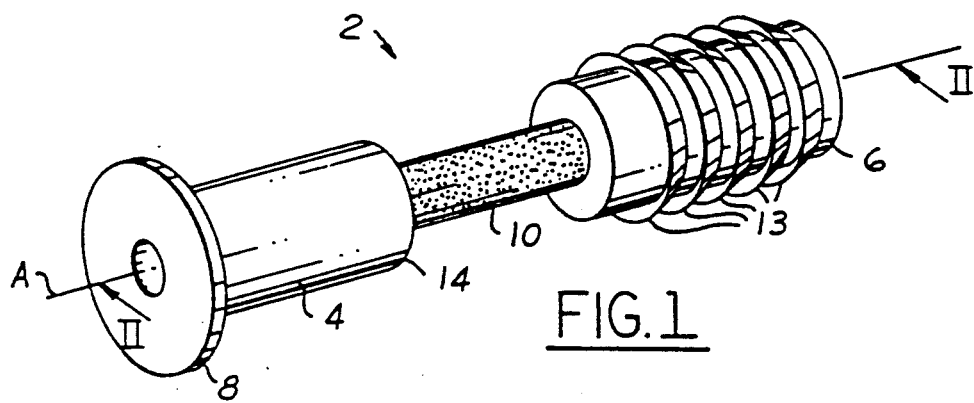
FIG. 1 is a perspective view of a fastener in accordance with the present invention.

Turning now to FIG. 1, fastener 2 essentially is illustrated as comprising three components, a head component 4, an externally barbed shank component 6, and a resilient linking means 10.

Head component 4 consists of a lower portion 14 and a unitary circular lip portion 8 having an external diameter larger than the external diameter of lower portion 14.

Shank component 6 is formed as a generally cylindrical externally barbed member and includes an opening 12 for receiving the direct application of force from a tool. Openings 12 extend completely through head component 4 and resilient linking means 10 and partially through shank component 12. Barbs 13 are molded onto shank component 6. Barbs 13 are of the type and shape found on press-on type fasteners commonly used in the automotive industry. Barbs 13 may be slotted or staggered. The length and flexibility of barbs 13 may be selected to best serve the strength requirements of the particular application in a manner well known in the fastener arts.

Resilient linking means 10 coaxially connects head component 4 to shank component 6 a fixed axially spaced distance apart while fastener 2 is in a free state. Openings 12 extend longitudinally along axis A and centrally through head component 4, resilient linking means 10 and into shank component 6.

Figure 2:
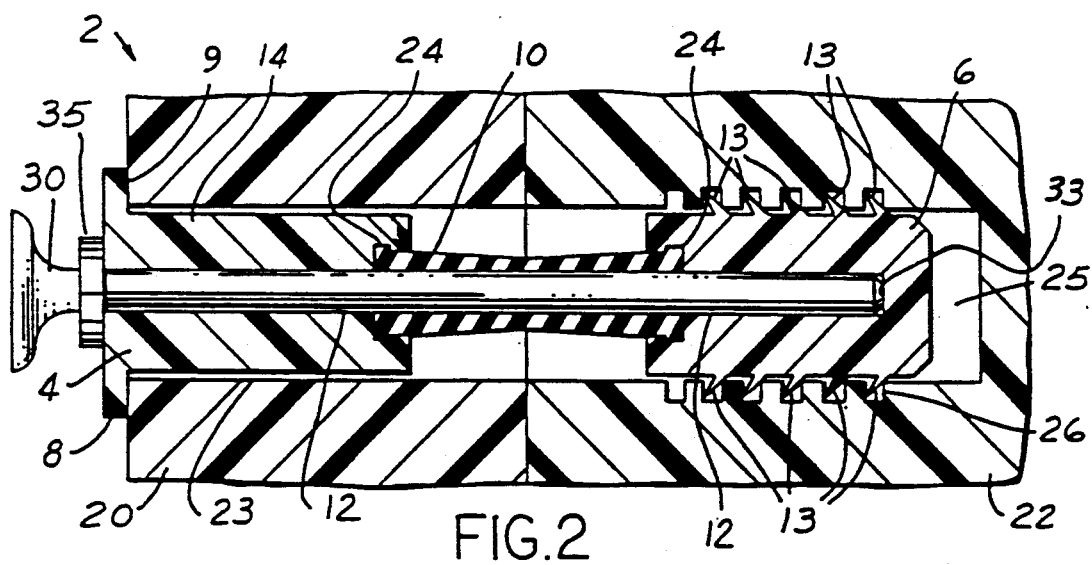
FIG. 2 is a cross sectional view of the fastener of FIG. 1 taken along the line II—II of FIG. 1 and showing an assembly of two work pieces.

Fastener 2 is shown in FIG. 2 attaching an outer plate 20 to an inner plate 22. Inner plate 22 may be any internally ribbed component such as a bracket or plate. Inner plate 22 has internal ribs 26 machined to receive shank component 6. Internal ribs 26 may be one or more circular slots cut into inner plate 22, alternatively, ribs 26 may be one or more circular projections extending to receive barbs 13. Additionally, internal ribs 26 may be triangularly shaped to mate with barbs 13 and provide an even greater degree of holding power. Many types and shapes of ribs are known in the art which are designed to retain barbed fasteners. Resilient linking means 10 coaxially connects shank component 6 with head component 4 and has an outer diameter smaller than the diameter of shank component 6.

A variety of means exist and are well known in the art for firmly attaching resilient linking means 10 to head and shank components 4, 6. To achieve this firmly secured connection, resilient linking means 10 may be molded into an opening or grove 24 within the head and shank components 4, 6.

Alternatively, head component 4, shank component 6 and resilient linking means 10 may be essentially simultaneous manufactured through coinjection. In this coinjection process, a mandrel is inserted through a mold and head and shank components and resilient linking means are injection molded around the mandrel. As the mandrel is removed, a coaxially aligned opening 12 runs partially through the fastener.

Openings 12 are configured to mate with a tool 30. Openings 12 extend completely through head component 4 and resilient linking means 10. Openings 12 may extend into shank component 6 or shank component 6 may be made completely solid. Tool 30 is inserted through openings 12 until the end portion 31 of tool 30 engages wall 33 of shank component 6. The continued application of force on tool 30 causes the axial displacement of shank component 6 with respect to head component 4.

The installation and use of the resilient fastener 2 shall be described below and shall generally refer to FIGS. 2 and 3. The alignment of openings 12 through head component 4, resilient linking means 10 and shank component 6, permits the free insertion of tool 30 therethrough. Fastener 2 is freely inserted into inner plate 22 until lip portion 8 engages contact area 9 of outer plate 20. Barbs 13 collapse when inserted through aperature 23 in outer plate 22. Barbs 13 remain collapsed until they engage ribs 26. Ribs 26 permit the internal resilience of barbs 13 to partially extend. Rearward axial movement of shank component 6 is restrained by the engagement of barbs 13 with ribs 26. Fastener 2 is inserted beyond this initial engagement by applying force to tool 30 thereby elongating resilient linking means 10 and causing the axial displacement of shank component 6 against the resilient biasing of resilient linking means 10. This elongation maintains the head and shank components in axial tension. The elongation of resilient linking means 10 lengthens fastener 2 a distance greater than its free state length.

Tool 30 is provided with a stop 35 to prevent the excessive elongation of resilient linking means 10. Stop 35 engages head component 4 and prevents the additional application of force on shank component 6. Resilient linking means 10 is not fully elongated and axial elongation (i.e. increasing thickness) of plates 20, 22 further axially elongates resilient linking means 10. Axial compression (i.e. decreasing thickness) of plates 20, 22 reduces the amount of elongation of resilient linking means 10, but resilient linking means 10 always remains elongated a distance greater than its free state length. This constant elongated state of resilient linking means 10, even when plates 20, 22 are axially compressed (i.e. decreased thickness), maintain plates 20, 22 and fastener 2 in compression at all temperatures.

Figure 3:
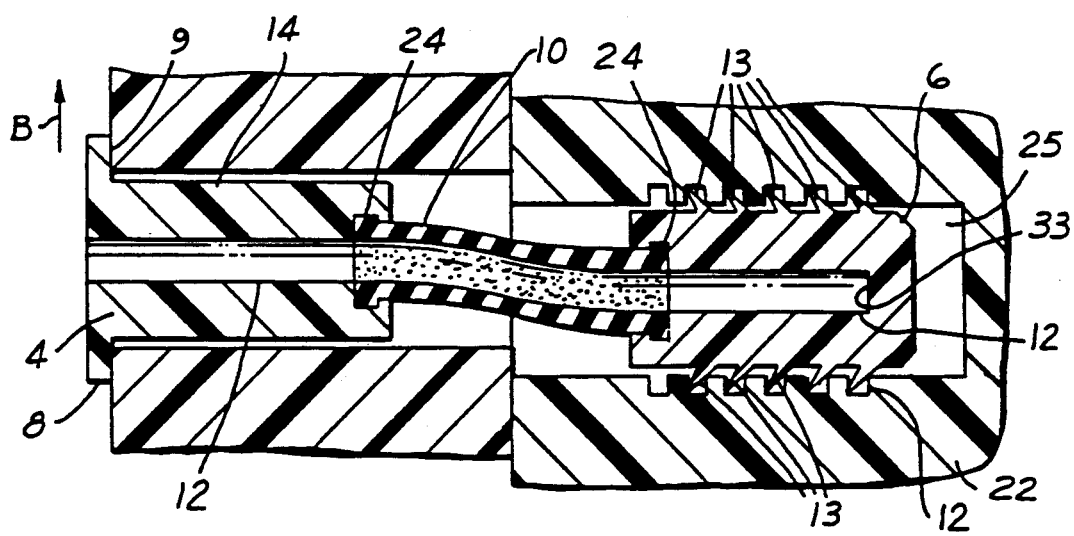
FIG. 3 is a cross sectional view of the fastener shown in FIG. 2 undergoing lateral displacement between the two plates.

Fastener 2 is shown undergoing a lateral displacement of plate 20 along the direction of arrow B in FIG. 3. Resilient linking means 10 is slightly distended and distorted from this lateral displacement but continues to transfer a compressive load between inner and outer plates 20, 22. Lip portion 8 may freely rotate about contact area 9.

Figure 4:
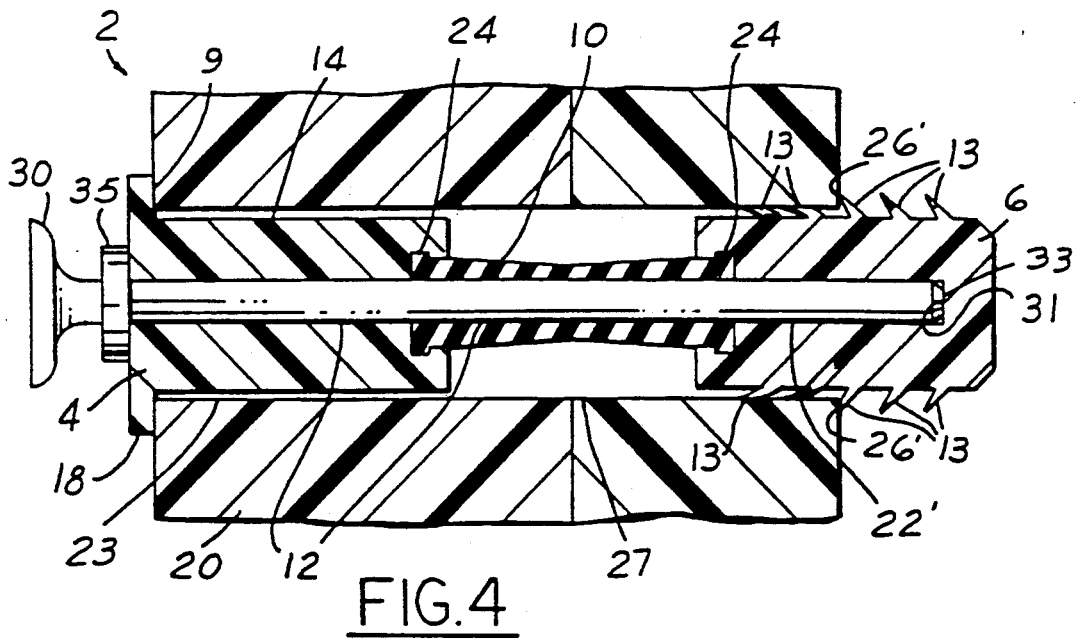
FIG. 4 is a cross sectional view of the fastener of FIG. 1 taken along the line II—II of FIG. 1 showing an alternative assembly of two work pieces.

Alternatively, fastener 2 may be designed to completely penetrate inner plate 22' as shown in FIG. 4. In this case, the interior surface 26' of inner plate 22' acts as a rib and retains barb 13. This alternative embodiment may be used when attaching a workpiece to a relatively thin plate. Barbs 13 collapse when inserted into outer plate 20 and remained collapsed until exiting the interior surface 26' of inner plate 22'. The internal resilience of barbs 13 cause them to extend beyond the radial periphery of opening 27 in inner plate 22' and prevent shank component 6 from moving axially rearward toward head component 4.

Head component 4 and shank component 6 may be made of any suitable material including metal or plastic, but are preferably made of a plastic material such as nylon or polytetrafluoroethylene. Resilient linking means 10 may be made of any resilient or elastomeric material having suitable compression and elongation characteristics. Typical materials include natural and synthetic rubbers and elastomeric plastic, of which many are known to one skilled in the art, some of which are commercially available, such as a product sold under the name TEXIN TM by Mobay Chemical Corporation.

Figure 5:
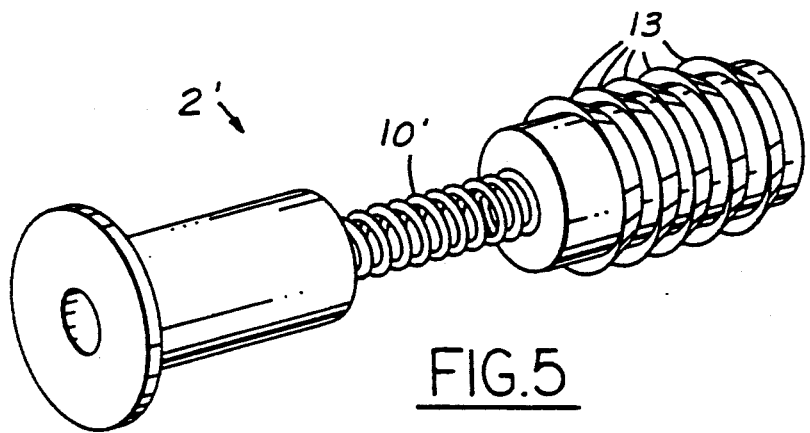
FIG. 5 is a perspective view of a first alternative embodiment of the fastener.
Figure 6:
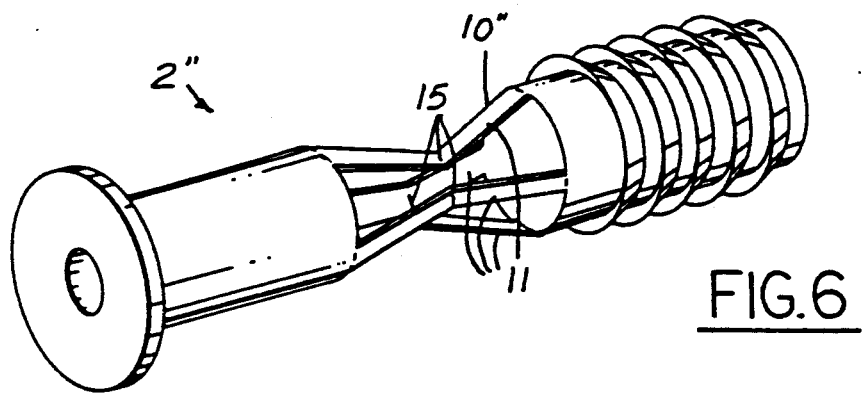
FIG. 6 is a perspective view of a second alternative embodiment of the fastener.

Alternatively, the resilient linking means may be made with a spring rather than an elastomeric material. The spring may be of a coil type or leaf type design. In the alternative embodiment of fastener 2' shown in FIG. 5, resilient linking means 10' is a metal coil spring which may be elongated a distance greater than its free state length. In the alternative embodiment of fastener 2" shown in FIG. 6, resilient linking means 10" is made from four meal leaf springs 11 connecting head and shank components 4,6. Each leaf spring 11 is made from a metal band having fold 13 in its center. It is preferable to face fold 15 inward to reduce the overall size of the aperture needed to insert fastener 2".

Resilient linking means 10', 10" may be attached to head and shank components 4, 6, by a variety of techniques. Preferably, resilient linking means 10', 10" is placed in an injection molding tool and head and shank components 4, 6 are formed about either end. The alternative embodiment shown in FIGS. 5 and 6 have the advantage that the metal spring has a low coefficient of thermal expansion which minimizes the elongation and compression fasteners 2', 2" undergo due to a change in temperature.

It should be recognized and understood that the foregoing description of presently preferred embodiments of the invention are presented for exemplification and not limitation of the invention. Certain modifications and variations of the fastener will be apparent to the skilled of the arts in view of the present disclosure and the present or future state of the art, which modifications and variations are intended to be within the scope of the following claims.

I claim:

1. A fastener comprising:
   a head component;
   an barbed shank component;
   a leaf spring connecting said head and shank components; and
   means defining a longitudinal opening adapted to receive a tool in driving engagement with said shank component for the application of force thereto.

2. The fastener of claim 1 wherein said longitudinal opening extends through said head component and said leaf spring.

3. The fastener of claim 1 wherein said head component and said shank component are formed of the same material.

4. The fastener of claim 3 wherein said material is plastic.

5. A fastener comprising:
   a plastic head component having a lip portion and a lower portion of smaller diameter than said lip portion, said lower portion being unitary and coaxial with said lip portion;
   an externally barbed plastic shank component;
   a resilient linking means connecting said lower portion and said shank component on a common axis, said resilient linking means of smaller diameter than said shank component, said resilient linking means is formed from a material selected from the group consisting of natural and synthetic rubbers, and elastomeric plastics; and said fastener having a longitudinal opening along said common axis adapted to receive a tool in driving engagement with said shank component for the application of force axially thereto.

6. The fastener of claim 5 wherein said head and shank components are plastic and said resilient linking means is formed from a material selected from the group consisting of natural and synthetic rubbers, and elastomeric plastics.

7. The fastener of claim 5 wherein said resilient linking means is a leaf type spring.

* * * * *